United States Patent [19]

Yamada et al.

[11] Patent Number: 5,398,187

[45] Date of Patent: Mar. 14, 1995

[54] CORRELATION DETECTION METHOD AND CONNECTIVITY-STRUCTURE ESTIMATION METHOD FOR NEURONS

[75] Inventors: Satoshi Yamada, Hyogo; Kenji Matsumoto, Hokkaido; Satoru Shiono, Hyogo, all of Japan

[73] Assignee: Mitsubishi Denki Kabushiki Kaisha, Tokyo, Japan

[21] Appl. No.: 922,857

[22] Filed: Jul. 31, 1992

[30] Foreign Application Priority Data

Aug. 6, 1991 [JP] Japan .................................. 3-219286
Nov. 12, 1991 [JP] Japan .................................. 3-295800
Dec. 2, 1991 [JP] Japan .................................. 3-317941
Jul. 6, 1992 [JP] Japan .................................. 4-200170

[51] Int. Cl.$^6$ ........................................... G06F 15/42
[52] U.S. Cl. ............................ 364/413.01; 364/413.05
[58] Field of Search ...................... 364/413.01, 413.02, 364/413.03, 413.05; 128/731

[56] References Cited

FOREIGN PATENT DOCUMENTS

3707998A1 9/1988 Germany .

OTHER PUBLICATIONS

Melssen, W. J. et al, "Detection and Estimation of Neural Connectivity Based on Cross Correlation Analysis", Biological Cybernetics issue No. 57 1987 pp. 403–414.
Aertsen, A. et al, "Dynamics or Neuronal Firing Correlation" Journal of Neurophysiology, vol. 61, #5, May 1989 pp. 900–917.
Yang et al., "Identification of Connectivity in Neural Networks", Biophysical Journal, issue 57 987–999, 1990.

*Primary Examiner*—Robert A. Weinhardt
*Attorney, Agent, or Firm*—Wolf, Greenfield & Sacks

[57] ABSTRACT

The present invention provides an interneuron crossrelation identification technique and an interneuron connection-structure estimation technique for inferring a connection-structure and the strengths of the connectivities among a plurality of neurons required for constructing a neural network model, by obtaining crossrelations among time-course data of neurons. The interneuron crossrelation detection technique may include steps of: calculating conditional probabilities by, among other things, normalizing crosscoincidence histograms calculated from time-course data of activities of the neurons representing a train of action potentials of the neurons representing a train of action potentials of the neurons, and comparing trains of symbols representing time-course states of the activities of the neurons; distinguishing an inhibitory connectivity form an excitatory connectivity by comparing the conditional probabilities to each other; and quantitatively estimating the magnitude of crossrelation among the time-course data. The interneuron connection-structure estimation technique may include steps of: computing conditional probabilities by normalizing cross-coincidence histograms calculated from time-course data of activities of the neurons representing a train of action potentials of the neurons; computing conditional mutual information and three-point mutual information from the computed conditional probabilities; and inferring a connection structure among the neurons.

16 Claims, 12 Drawing Sheets

CORRELATION DETECTION METHOD AND CONNECTIVITY-STRUCTURE ESTIMATION METHOD FOR NEURONS

BACKGROUND OF THE INVENTION

1. Field of the Invention

The present invention relates to a correlation detection method and a connection-structure estimation method for identifying connections and estimating a connection structure among neurons and their synaptic strengths which are required for construction of a neural network model which attracts much research attention in recent years. The methods are based upon time-dependent correlation among data pertaining to a plurality of neurons.

2. Description of the Prior Art

In recent years, research activities on neural-network models are done extensively, resulting in a large number of proposed neural-network models. These research activities are aimed at the development of a neuro-computer for implementing functions which are difficult to realize with the von Neumann computer.

At the present time, however, the performance of such a neural-network model is still not satisfactory in comparison with the information-processing capability of animals. Therefore, it is strongly believed that neural network models based on the study of information processing mechanism of animals' nervous systems should have better performance.

In order to construct a model of a neuronal network of nervous systems, it is the most important to clarify the structure of the neuronal network of nervous system and estimate the synaptic strengths among a large number of neurons based on results of their activities measurement. Therefore, a variety of techniques for detecting connectivities among neurons from time-course data of the neurons have been tried so far.

FIG. 1 shows a flowchart of a typical conventional technique for detecting connectivities among neurons described in a paper that appears on pages 403 to 414 of the Biological Cybernetics magazine, Issue No. 57 published in 1987.

As shown in the figure, the flowchart comprises three steps ST1, ST2 and ST3. At the step ST1, data is input. At the step ST2, a crosscoincidence histogram is calculated. At the step ST3, a scaled crosscoincidence histogram is calculated.

Next, operations performed in accordance with the flowchart are explained. First of all, at the ST1, action potential train data of two neurons X and Y are input. Then, at the step ST2 a histogram $CCH_{xy}(t)$ of time difference of action potentials between neurons X and Y is calculated from the data input at the step ST1. This histogram $CCH_{xy}(t)$ is referred to hereafter as a crosscoincidence histogram.

Subsequently, at the step ST3, the crosscoincidence histogram $CCH_{xy}(t)$ calculated at the step ST2 is normalized into a scaled crosscoincidence histogram $SCCH_{xy}(t)$ in order to eliminate effects of the measurement time and the number of action potentials. The scaled crosscoincidence histogram $SCCH_{xy}(t)$ is given by Eq. 1 as follows:

$$SCCH_{xy}(t) = T \times CCH_{xy}(t) / (N_x \times N_y \times \Delta) - 1 \quad (1)$$

where T is the measurement time, $N_x$ is the number of action potentials of the neuron x, $N_y$ is the number of action potentials of the neuron Y and DELTA is the width of the unit time used in the histogram.

The following three problems are encountered in the analysis of action potential train data of actual neurons by means of the conventional technique for detecting connectivities among neurons described above. The first problem is that the detection sensitivity is bad due to a poor correlation S/N ratio. The second problem is that since the scaled crosscoincidence histogram does not depend on the synaptic strength in a simple way, it is difficult to estimate the synaptic strength from the scaled crosscoincidence histogram. The third problem is that since the scaled crosscoincidence histogram depends on the frequency of action potential of presynaptic neuron, it is impossible to distinguish variations of the scaled crosscoincidence histogram caused by changes in synaptic strength from variations caused by changes in frequency of action potential.

In particular, it is important to put the third problem into consideration when analyzing a learning mechanism which is expected as an essential function of a neural network model. The learning of nervous systems is given rise to by the change in synaptic strength. Accordingly, in order to analyze a learning mechanism, it is necessary to estimate the change in synaptic strength among neurons by a learning process.

It is extremely difficult to analyze the learning mechanism by the correlation detection method which depends not only on synaptic strength but also on the frequency of action potentials of a presynaptic neuron, because such method cannot estimate the change in synaptic strength.

A concrete example is given by explaining results of a study by simulation of a neuron model. The simulation results show how a scaled crosscoincidence histogram depends upon the synaptic strength and the frequency of action potential of a presynaptic neuron.

In this example, neuronal activities of neurons X and Y shown in FIG. 7 are simulated by an equation expressed by Eq. 2 below. This equation which was proposed by Hodgkin and Huxley in 1952 has been generally used because it describes neuronal activities and action potential phenomena most accurately.

$$\begin{aligned} I = \ & C \times dV/dt + g_{Na} \times m^3 \times h \times (V - E_{Na}) + \\ & g_k \times n^4 \times (V - E_K) + g_L \times (V - E_L) + \\ & g_{Syn} \times f(t) \times (V - E_{syn}) \end{aligned} \quad (2)$$

where I is a membrane current, C is a membrane capacitance, V is a membrane potential, $g_{Na}$, $g_k$, $g_L$ and $g_{Syn}$ are maximum conductances of a sodium current, a potassium current, other ion currents and a synaptic current, $E_{Na}$, $E_K$, $E_L$ and $E_{syn}$ are equilibrium potentials of the sodium current, the potassium current, the other ion currents and the synaptic current, m, h and n are parameters of sodium activation, sodium inactivation and potassium activation and f(t) is a function expressing variations in synaptic current with the lapse of time.

The first and the other terms on the right side of Eq. 2 represent a capacitance current and ion currents, respectively. Especially the fifth term represents the synaptic current.

In addition, the parameters m, h and n representing activities of ion currents can each also be expressed by a differential equation and depends on a membrane potential. For example, a differential equation for the parameter m representing activation of sodium currents is given by Eq. 3 as follows:

$$dm/dt = (1-m) \times \alpha - m\beta$$

$$\alpha = 0.1 \times (-35-V)/(\exp((-35-V)/10)-1)$$

$$\beta = 4 \times \exp((-60-V)/18) \qquad (3)$$

Likewise, differential equations for the parameters h and n are also expressed similarly to Eq. 3. By solving four differential equations, i.e. Eq. 2 and the equations for the parameters m, h and n, variations in membrane potential of the neurons and the generation of action potentials can be computed. FIG. 2 shows a scaled crosscoincidence histogram computed from action potential trains of the neurons X and Y obtained by simulation. As shown in the figure, at a time delay of 11 ms, a correlation peak is detected. Then the simulation and the computation of the scaled crosscoincidence histogram were performed by varying the synaptic strength and the frequency of action potentials.

FIG. 3 shows the relation between synaptic strength and the peak value of scaled crosscoincidence histograms which are calculated from action potential trains obtained by each simulation. The horizontal axis of the figure represents relative synaptic strengths in a neuron model. The curves represent relations between the synaptic strength and the peak value for different action potential frequency.

It is obvious from the results of simulation of a neuron model shown in FIG. 3 that even for a given synaptic strength, the peak value is different from histogram to histogram depending upon action potential frequency of the neuron X.

In order to propose a new correlation detection method, we pay attention to the information theory which has not been taken notice in the neurological field. In the information theory, a quantity called mutual information is particularly focused on. This quantity represents an information flowing between two processes statistically. It should be noted that the mutual information has relation with the synaptic strength between neurons.

In general, it is believed that connectivity between two neurons X and Y can be detected by the mutual information. Eq. 4 given below was derived in order to calculate mutual information from time-course data of action potentials of two neurons X and Y:

$$I(X:Y_t) = \Sigma p(Y_{j,t}|X_i) p(X_i) \log (p(Y_{j,t}|X_i)/p(Y_{j,t})) \qquad (4)$$

where $I()$ is the mutual information $p(Y_{j,t}|X_i)$ is a conditional probability that the state of the neuron Y is $Y_{j,t}$ at a time difference of t when the state of the neuron X is $X_i$ and $p(X_i)$ and $p(Y_{j,t})$ are probabilities of occurrence that the state of the neuron X is $X_i$ and the state of the neuron Y is $Y_j$ respectively. The summation on the right side of Eq. 4 is carried out for the states of the neurons X and Y.

FIG. 4 shows a computation result of the mutual information for the same train of action potentials as FIG. 2. In comparison with FIG. 2, the peak relative to the background is higher, so mutual information detects the correlation more sensitively than the scaled crosscoincidence histogram.

The conventional technique using mutual information for detecting a connectivity between neurons is implemented by following the procedure described above. The mutual information is a function of frequency of action potentials of presynaptic neuron, p ($X_i$), as shown by Eq. 4. Therefore, the conventional technique using mutual information has a problem that it is difficult to distinguish variations caused by changes in synaptic strength from variations caused by changes in frequency of action potentials as well as the conventional method using scaled crosscoincidence histogram. In addition, the conventional technique using mutual information has another problem that it is impossible to distinguish an inhibitory synaptic connectivity from an excitatory synaptic connectivity because the mutual information is always nonnegative.

Next, conventional techniques related to the method of estimation of a connection structure among neurons is described.

In order to analyze the dynamic behavior of a nervous system from multi-point recording data, first of all, it is necessary to detect connections among neurons and to estimate the connection structure among the neurons. That is why connectivities among neurons have to be computed and the connection structure among the neurons must be estimated. By merely calculating the connectivity between two neurons, however, it is impossible to distinguish a direct synaptic connectivity between the two neurons from an indirect connectivity dependent on activities of another neuron. In order to solve this problem, a variety of techniques for distinguishing a direct synaptic connectivity between the two neurons from an indirect connectivity have been tried.

FIG. 5 shows a flowchart of the conventional technique for estimating a connection structure among neurons described on pages 987 to 999 of the Biophysical Journal, Issue No. 57, published in 1990. As shown in the figure, the flowchart comprises a data-input step ST4, a crosscoincidence-histogram-calculation step ST5, a probability-calculation step ST6 and a step ST7 at which a connectivity between two neurons independent of a third one is calculated.

The following is a description of operations of the conventional technique. First of all, at the step ST4, time-course data of action potentials of three neurons X, Y and Z is input. Subsequently, at the step ST5, crosscoincidence histograms $CCH_{XY}(t)$, $CCH_{XZ}(t)$, $CCH_{YZ}(t)$ among the three neurons X, Y and Z are computed. Here, t represents a time difference of the neuron Y with the neurons X and Z taken as a reference. Next, at the step ST6, these crosscoincidence histograms are normalized and joint probabilities $p(X,Y_t,Z)$, $p(X,Z)$, $p(Y_t,Z)$, are calculated.

Then, a connectivity h(t) between the neurons X and Y is estimated by using Eq. 5 given below.

$$h(t) = \log ((p(X,Y_t,Z)p(Z))/(p(X,Z)p(Y_t,Z))) - \log r^* \qquad (5)$$

where r* is defined by Eq. 6 as follows.

$$r^* = E[f_y(t,\Theta_t^Y) p(X)Z]/(E[f_y(t,\Theta_t^Y)Z]E[p(X)Z]) \qquad (6)$$

where E[] is an expectation value, $f_y(t,\Theta_t^Y)$ is a probability of firing when an internal state and past history of the neuron Y are given.

When estimating a connectivity relation between neurons using the conventional technique of estimation, the participation of the third neuron Z in the connectivity between the two neurons X and Y can be eliminated. In spite of that, the conventional technique has a problem that the technique cannot estimate how the third neuron Z participates in the connectivity between the two neurons X and Y.

SUMMARY OF THE INVENTION

It is the first object of the present invention to provide an interneuron-connectivity detection technique that can be used for sensitively detecting a connectivity between neurons and calculating quantitatively the synaptic strength and its change independent of the frequency of action potentials of a presynaptic neuron.

It is a second object of the present invention to provide an interneuron connection-structure estimation technique that can be used for estimating a connection structure among three or more neurons by calculation of connectivities from time-course data of the three or more neurons.

In the interneuron-connectivity detection technique provided by the present invention in order to achieve the first object described above, first of all, conditional probabilities are computed. Then, the conditional probabilities are used for calculating another information quantity, a channel capacity, the maximum value of activity-potential generation probability on the mutual information with respect to firing probability of a presynaptic neuron. Subsequently, the conditional probabilities are compared to each other in order to distinguish an excitatory connectivity from an inhibitory one and, finally, to calculate quantitatively the synaptic strength among time-course data.

That is to say, the interneuron-connectivity detection technique provided by the present invention focuses on a concept called the channel capacity related to the mutual information quantity. As described above, the channel capacity is the maximum value of the mutual information with respect to firing probability of presynaptic neuron. The channel capacity, which represents the capacity of information flow, provides a sensitive correlation detection similar to the mutual information and a quantitative estimate of synaptic strength independent of firing probability of a presynaptic neuron. In addition, because action potentials of excitatory presynaptic neuron increases the firing probability of postsynaptic neuron, the distinction of excitatory connection from inhibitory one is realized by the comparison of the conditional probabilities.

In the interneuron-connection-structure estimation technique provided by the present invention in order to achieve the second object described above, first of all, conditional probabilities are computed from time-course data of neuron activities. Then, the computed conditional probabilities are used for calculating a multi-point mutual information and a conditional mutual information which are known in the information theory. Subsequently, the values of the multi-point mutual information and the conditional mutual information are used for estimating an effect of a third neuron on the connectivity between two neurons to give an estimate of a connection structure among three or more neurons.

To be more specific, with the interneuron-connection-structure estimation technique provided by the present invention, a relation among three neurons can be estimated from the sign of a three-point mutual information quantity. That is to say, a positive three-point mutual information indicates that the connectivity between two neurons includes an indirect connectivity dependent upon the activity of a third neuron. On the other hand, a negative three-point mutual information indicates a higher order connectivity in which the firing of a third neuron changes due to a simultaneous firing of the two other neurons. In addition, for a positive three-point mutual information, a connectivity between the two neurons that does not depend on the third neuron can be computed by calculating a conditional mutual information. In the case of a negative three-point mutual information, on the other hand, the property of the higher-order connectivity can be estimated by calculating the conditional mutual information.

For a complete understanding of the present invention, other objects and new features, reference should be made to the following detailed description of the present invention and accompanying drawings. It should be noted, however, that the drawings are given mainly for the description of the present invention and, therefore, do not limit the scope of the present invention.

BRIEF DESCRIPTION OF THE DRAWINGS

FIGS. 17(a)–17(d) is an explanatory diagram showing a neuron model and a computation result.

DETAILED DESCRIPTION OF THE PREFERRED EMBODIMENTS

Hereafter, the interneuron correlation detection technique according to a first aspect of the present invention is described in detail with reference to embodiments thereof shown in the accompanying diagrams.

First Embodiment

Figure 6:
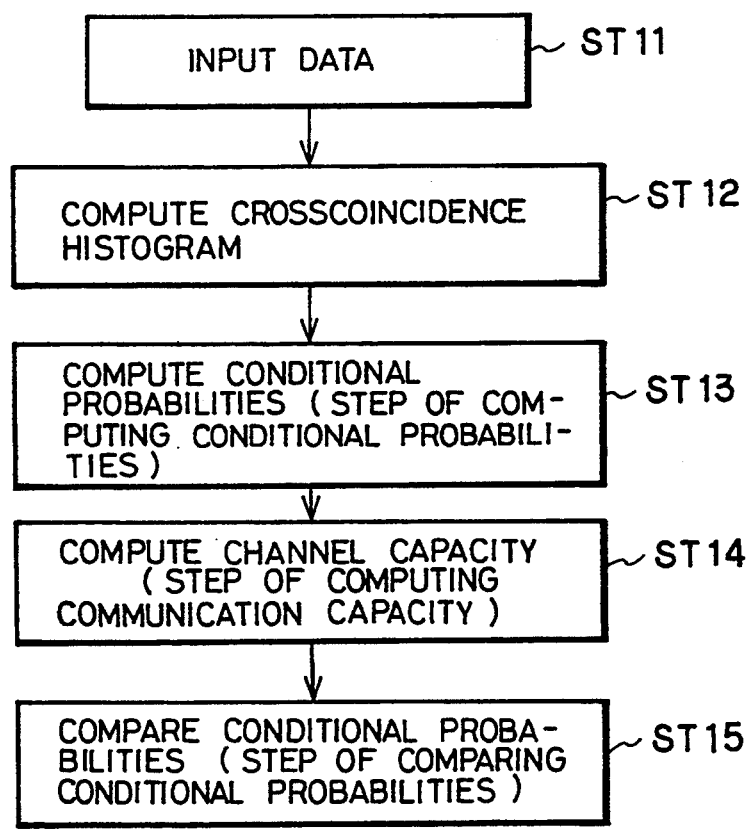
FIG. 6 shows the flowchart of an embodiment implementing an interneuron correlation detection method in accordance with a first aspect of the present invention.

FIG. 6 shows a flowchart showing the flow of processing of detecting correlation by calculating the value of a channel capacity from action potential trains of two neurons.

As shown in the figure, the flow of processing comprises a data input step ST11, a crosscoincidence-histogram calculation step ST12, a conditional-probability calculation step ST13, a channel-capacity calculation step ST14 and a conditional-probability comparison step ST15.

Figure 11:
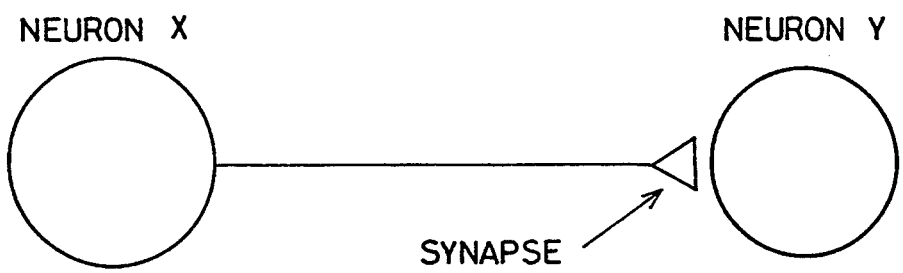
FIG. 11 is an explanatory diagram showing a neuron model to which the interneuron correlation detection method provided by the present invention and the conventional interneuron correlation detection method are applied.

Let us, in this case, consider a synaptic connectivity between two neurons X and Y shown in FIG. 11.

Figure 7A:
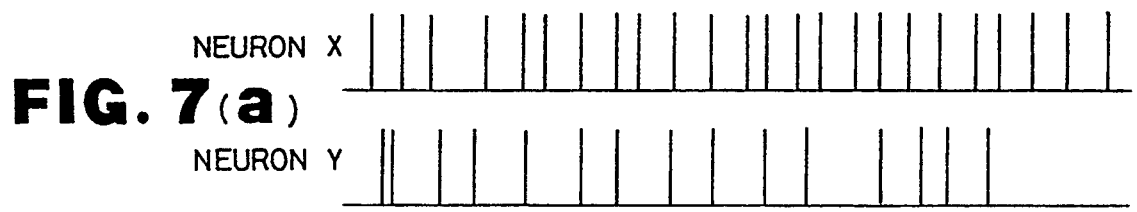
FIGS. 7($a$)–7($d$) is an diagram showing a process of computing a channel capacity in the above embodiment.

First of all, at the step ST11, data is input. The data is trains of occurring time of action potentials of the presynaptic neuron X and the postsynaptic neuron Y as shon in FIG. 7(a). Then, at the step ST12, a crosscoincidence histogram of time differences of action potentials between the neurons X and Y is calculated. A calculation result is shown in FIG. 7(b).

Figure 7B:
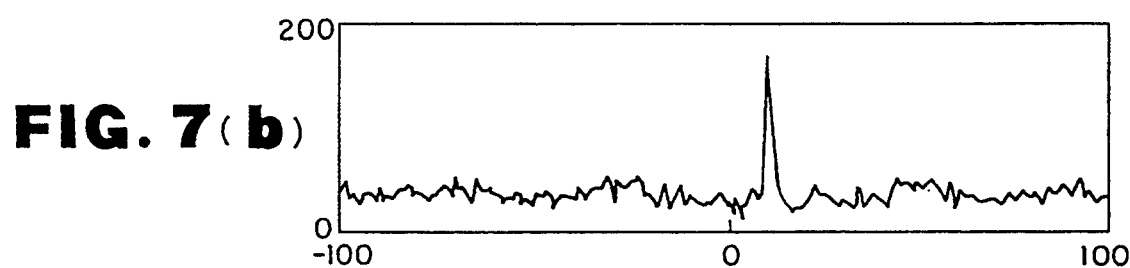
Figure 7C:
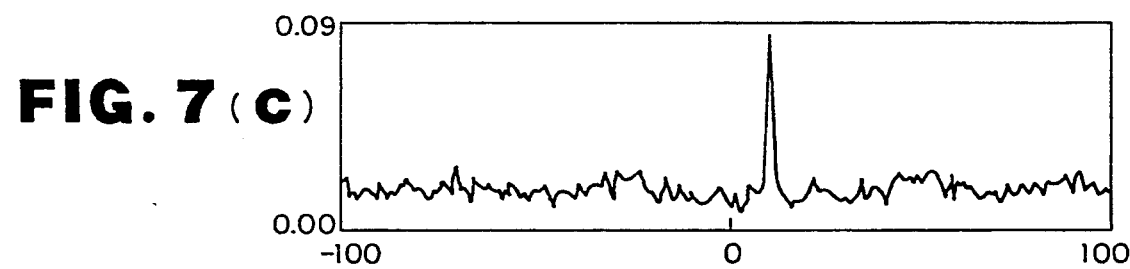

Next, the crosscoincidence histogram shown in FIG. 7(b) is normalized. A conditional probability $p(Y_{1,t}|X_1)$ that the neuron Y generates an action potential at a time difference t from a time at which the neuron X generated an action potential is calculated. A calculation result is shown in FIG. 7(c).

Further, $p(Y_{1,t}|X_0)$ is approximated to be firing probability of the neuron Y and, at the step ST13, other conditional probabilities $p(Y_{0,t}|X_1)$ and $p(Y_{0,t}|X_0)$ are calculated in accordance with Eq. 7 shown below.

$$p(Y_{0,t}|X_1) = 1 - p(Y_{1,t}|X_1)$$

$$p(Y_{0,t}|X_0) = 1 - p(Y_{1,t}|X_0) \quad (7)$$

The maximum value of the mutual information is given by Eq. 8 as follows:

$$C = \log_2(2^{x1} + 2^{x2}) \quad (8)$$

where $$x1 = (p \times H(q) + q \times H(p) - H(p))/(1-p-q)$$

$$x2 = (p \times H(q) + q \times H(p) - H(q))/(1-p-q) \quad (9)$$

where $$H(p) = -p \times \log_2 p - (1-p) \times \log_2(1-p)$$

$$H(q) = -q \times \log_2 q - (1-q) \times \log_2(1-q)$$

where $p = p(Y_{0,t}|X_1)$ and $q = p(Y_{1,t}|X_0)$

Figure 7D:
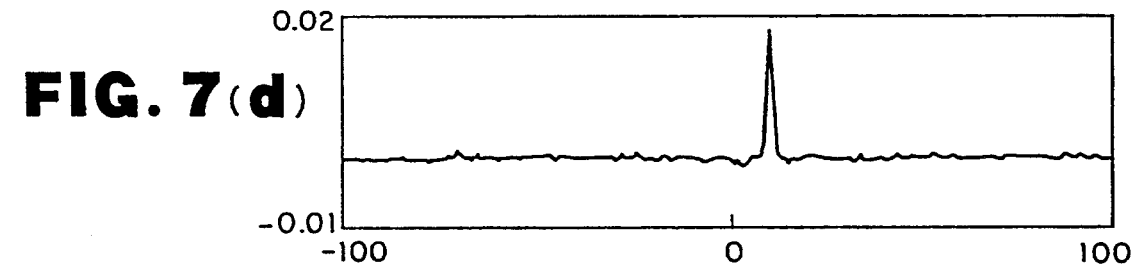

Eqs. 8 and 9 are used at the step ST14 for calculating the channel capacity, C, the maximum value of the mutual information. A calculation result produced at the step ST14 is shown in FIG. 7(d).

Next, at the step ST15, the conditional probabilities $p(Y_{1,t}|X_1)$ and $p(Y_{1,t}|X_0)$ are compared in order to distinguish an excitatory connectivity from an inhibitory connectivity. For the former having a value smaller than the latter, the channel capacity C is set to be negative. In the case of the former having a value greater than the latter, the channel capacity C is set to be positive.

The conditional probability $p(Y_{1,t}|X_1)$ having a value smaller than $p(Y_{1,t}|X_0)$ indicates that the generation of action potentials of neuron Y is reduced by action potentials of neuron X, suggesting that the connectivity is inhibitory. In this case, the channel capacity is set to be negative to denote an inhibitory connectivity. Conversely, the conditional probability $p(Y_{1,t}|X_1)$ having a value greater than $p(Y_{1,t}|X_0)$ assigns a positive sign to the channel capacity, suggesting an excitatory connectivity.

Figure 8:
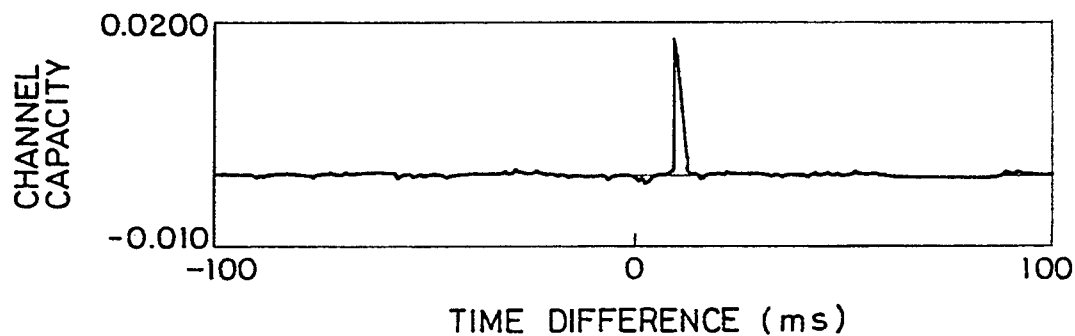
FIG. 8 is an explanatory diagram showing values of the channel capacity computed from action potential trains of two neurons.

FIG. 8 shows a result of the channel capacity calculated from action potential trains obtained by simulation of two neurons X and Y shown in FIG. 11. The simulation is based on Eq. 2, the equation proposed by Hodgkin and Huxley. It should be noted that the action potential trains are the same as the one used in the computation result of which is shown in FIG. 2.

Figure 1:
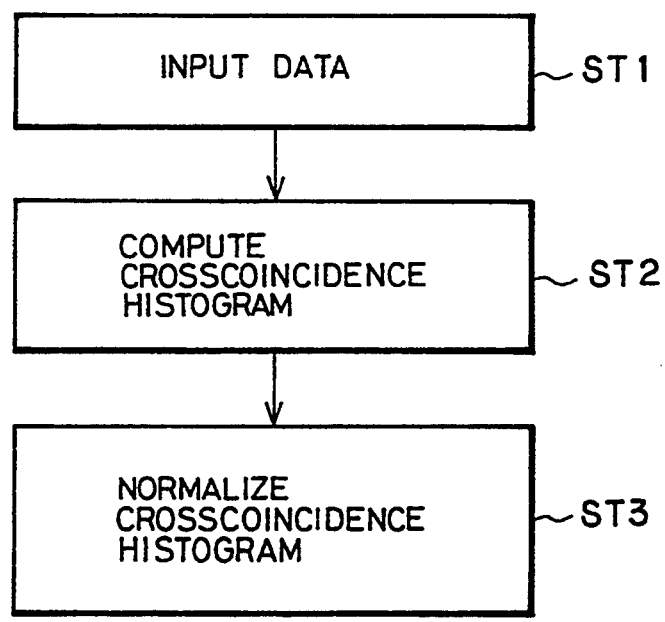
FIG. 1 shows the flowchart of the conventional interneuron correlation detection method.
Figure 2:
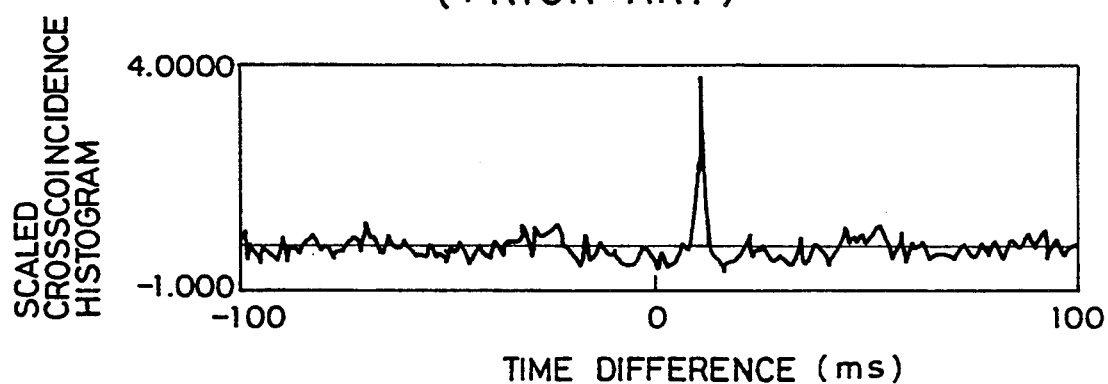
FIG. 2 is an explanatory diagram showing a scaled crosscoincidence histogram computed from action potential trains of two neurons.
Figure 4:
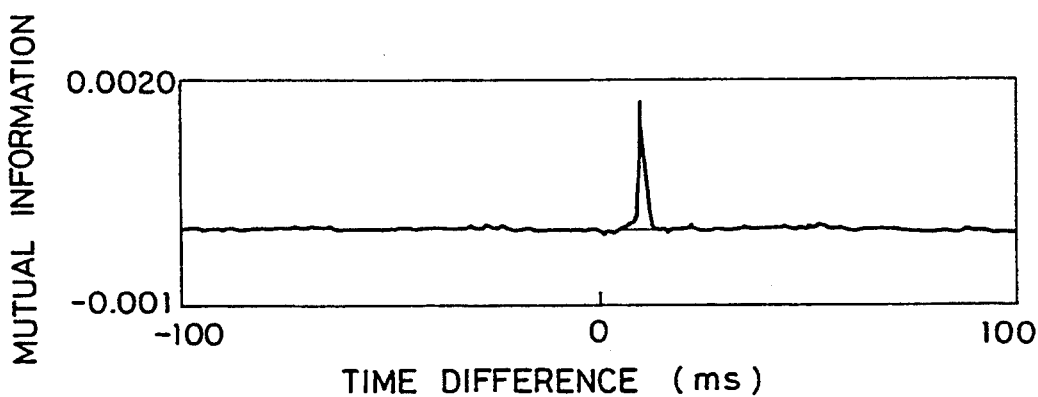
FIG. 4 is an explanatory diagram showing mutual information computed from action potential trains of two neurons.
Figure 5:
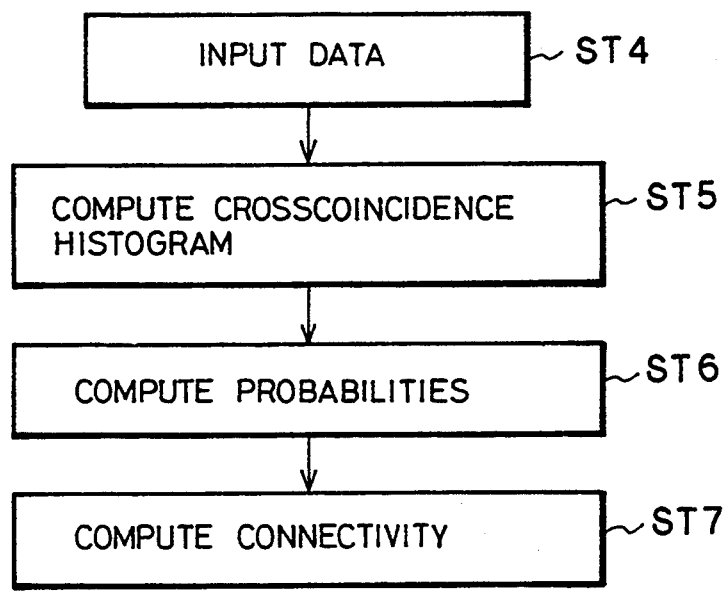
FIG. 5 shows the conventional interneuron connection structure estimation method.

As shown in FIG. 8, the ratio of the correlation peak to the background is higher than that of the scaled crosscoincidence histogram shown in FIG. 2. It is obvious from FIG. 8 that a connectivity can be detected sensitively as is the case with the mutual information shown in FIG. 4.

Figure 9:
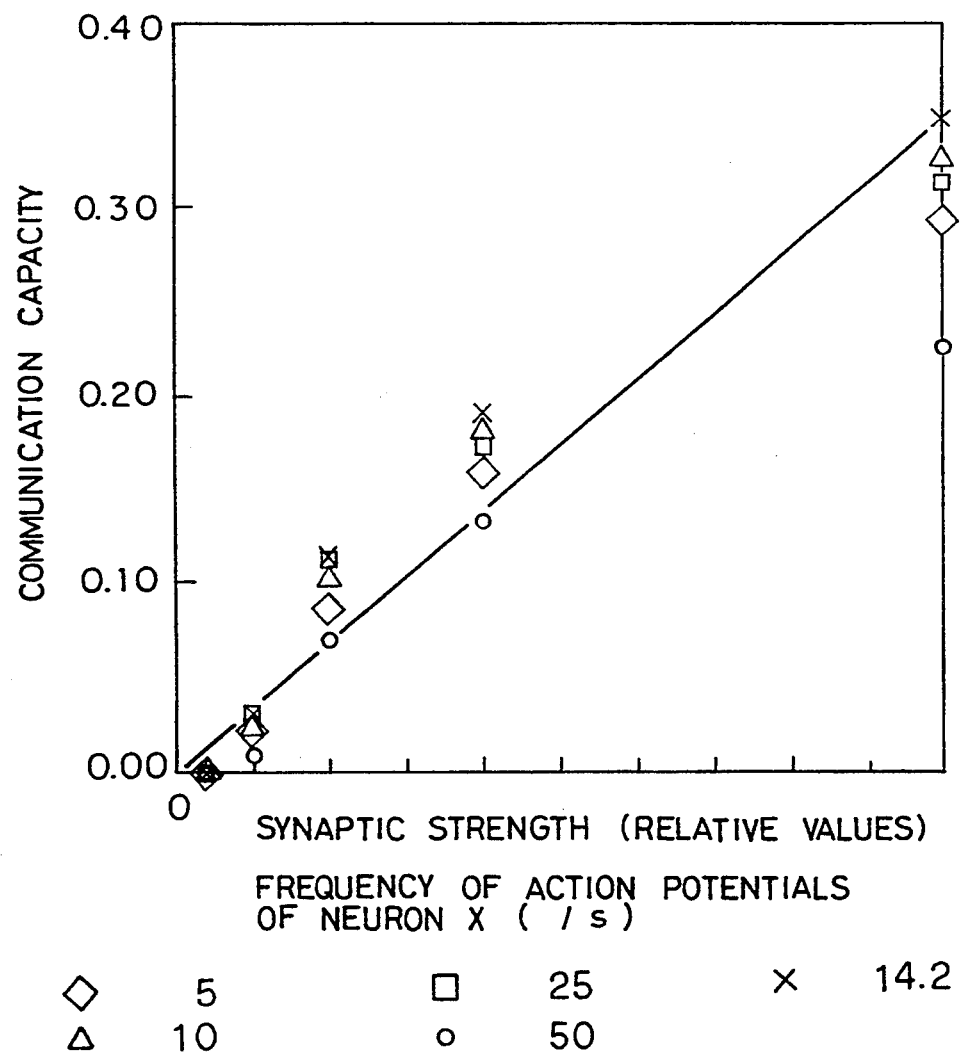
FIG. 9 is an explanatory diagram showing a relation between interneuron connectivity strengths and channel capacities of an excitatory-connection model.

FIG. 9 shows a result of a study of relation between the channel capacity and the synaptic strength with the action-potential frequency taken as a parameter, or to be more specific, a study of dependence of the channel capacity on the synaptic strength and the action-potential frequency. The result was obtained by computing the channel capacity from simulation results done for FIG. 8 for a variety of synaptic strengths and action potential frequencies of the presynaptic neuron. In this case, the same action potential trains used in FIG. 3 was used.

Figure 3:
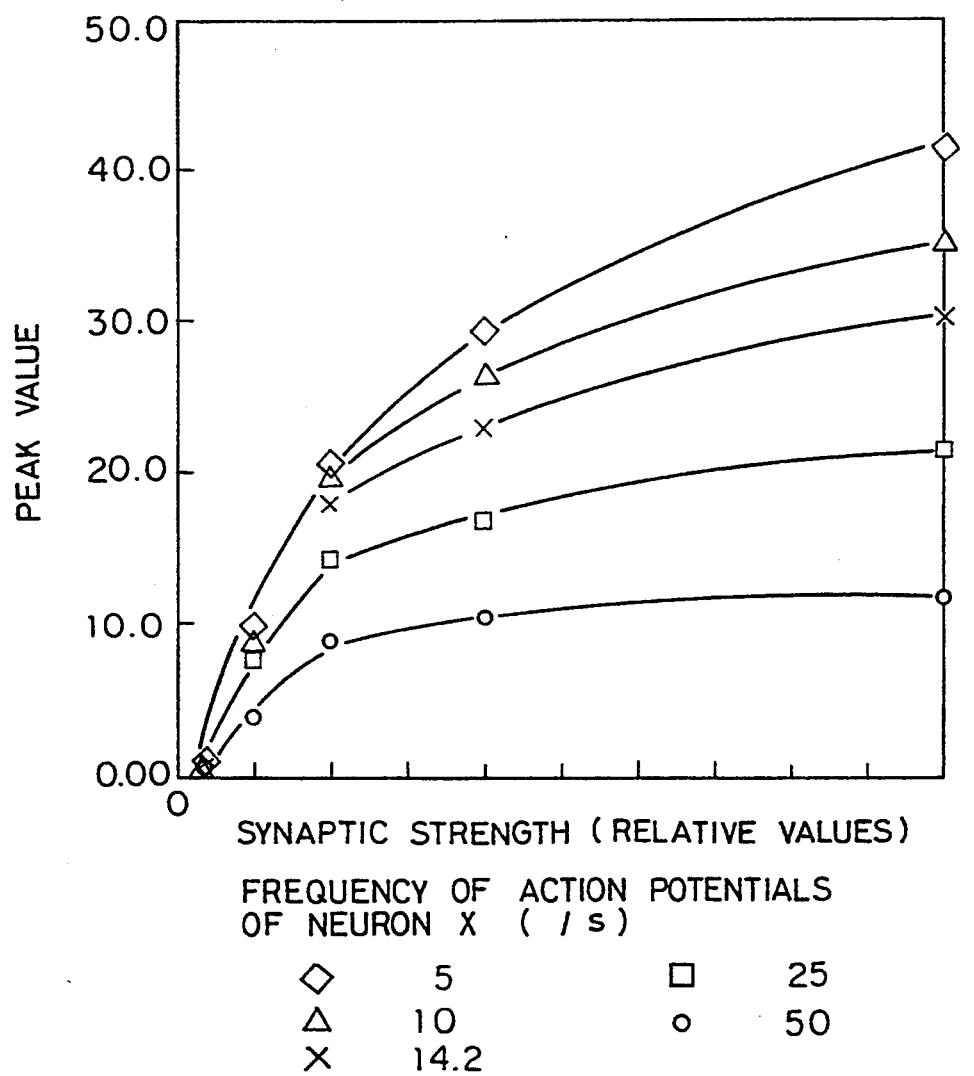
FIG. 3 is an explanatory diagram showing relations between synaptic strengths and mutual information.

The scaled crosscoincidence histogram shown in FIG. 3 clearly depends upon the frequency of action potentials of the neuron X. From FIG. 9, however, it is obvious that the channel capacity does not depend on the frequency of action potentials of the neuron X and that the channel capacity varies linearly with the synaptic strength.

Accordingly, by using the channel capacity, a synaptic strength can be estimated quantitatively without regard to the frequency of action potentials of the neuron which varies due to, among other things, a learning process. In addition, the use of the channel capacity allows the quantitative estimation of change in the synaptic strength caused by a learning process.

Moreover, the channel capacity is proportional to the synaptic strength as opposed to a scaled crosscoincidence histogram which is not so proportional to the synaptic strength. The synaptic strength can thus be estimated quantitatively by computation of the channel capacity.

Second Embodiment

In the first embodiment, the calculation of the synaptic strength for an excitatory synaptic connectivity has been described. A second embodiment allows the connectivity strength to be computed from the channel capacity even for a case in which the synaptic connectivity is inhibitory.

Figure 10:
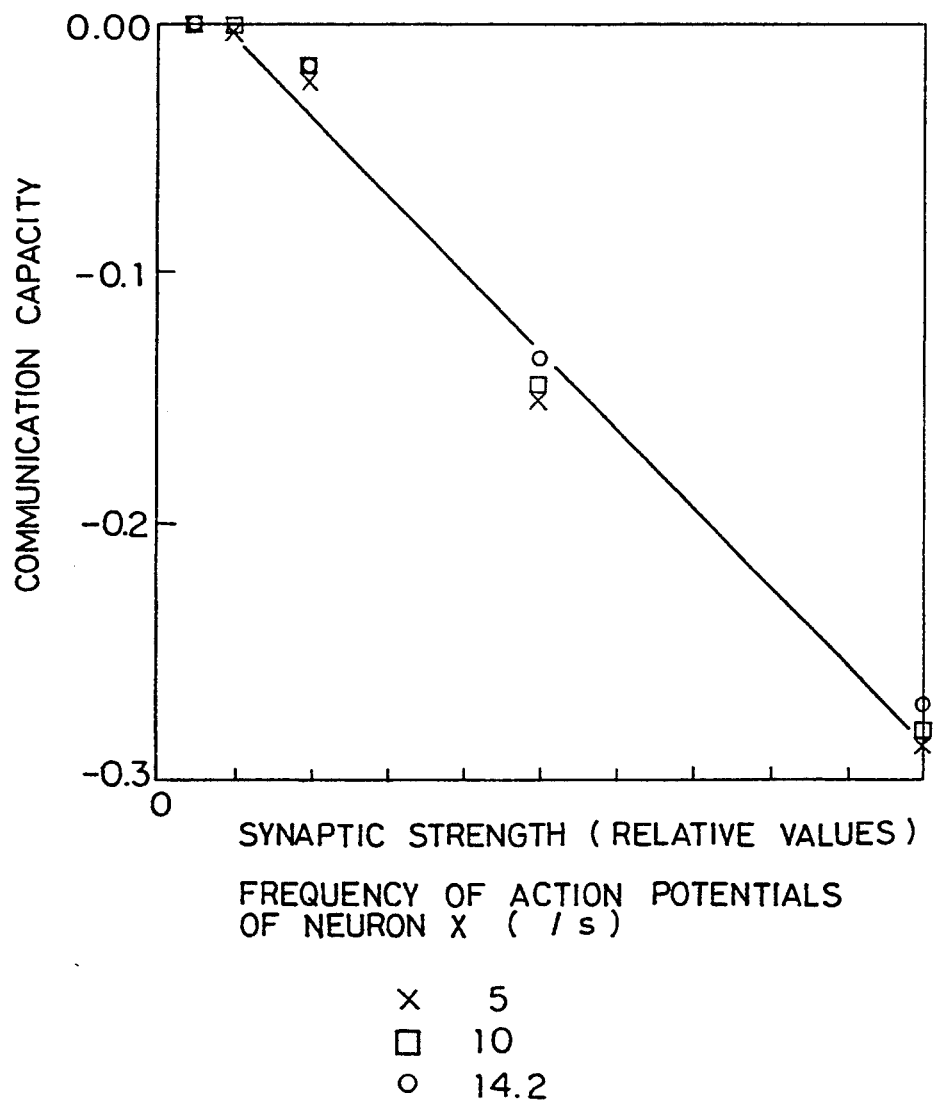
FIG. 10 is an explanatory diagram showing a relation between interneuron connectivity strengths and channel capacities of an excitatory-connection model.

FIG. 10 shows a result of computation for the same model as that for FIG. 9. In the case of an inhibitory synaptic connectivity, a negative sign is assigned to the channel capacity at the step ST15 as described earlier, allowing the inhibitory synaptic connectivity to be distinguished from an excitatory synaptic connectivity.

Furthermore, in the case of an inhibitory connectivity, the channel capacity is linearly proportional to the synaptic strength as shown in FIG. 10 without regard to the frequency of action potentials of the neuron X.

Third Embodiment

In the embodiments described above, the calculation of conditional probabilities based on crosscoincidence histograms has been described. In a third embodiment, the state of a train of time-course events is expressed by a train of symbols. A technique for calculating a conditional probability is based on comparison of such trains of symbols.

Fourth Embodiment

In the embodiments described above, the binary values 0 and 1 are used to represent states of neurons. In a fourth embodiment, three or more states of neurons can be used for computing probabilities from time-course data representing membrane potentials of neurons.

The following is a description of embodiments shown in the accompanying diagrams, wherein techniques for inferring a connection structure among neurons in accordance with the second aspect of the present invention are adopted.

Fifth Embodiment

Figure 12:
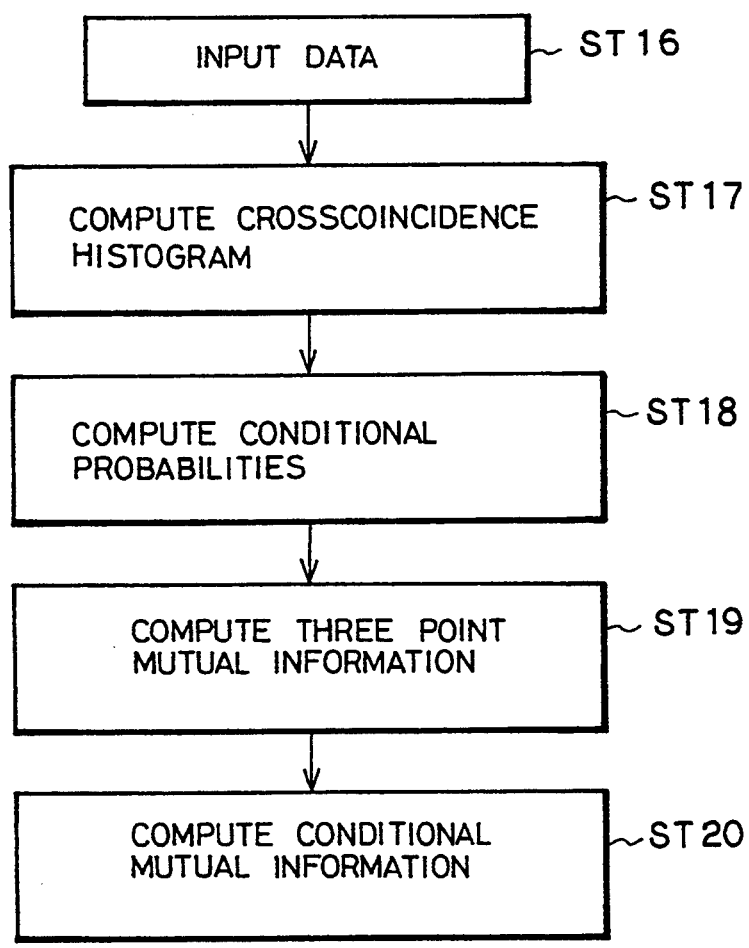
FIG. 12 shows the flowchart of an embodiment implementing an interneuron connection-structure estimation method in accordance with a second aspect of the present invention.

FIG. 12 shows a flowchart of a flow of processing for inferring a connection structure among three neurons by calculating three-point mutual information and conditional mutual information from time-course data of the three neurons. As shown in the figure, the flowchart comprises a data input step ST16*, a conditional-probability calculation step ST18, a three-point mutual information calculation step ST19 using conditional probabilities and a conditional-mutual information calculation step ST20.

*a crosscoincidence-histogram calculation step ST17

First of all, at the step ST16, data indicating times of action potentials of three neurons X, Y and Z is input. Then, at the step ST17, crosscoincidence histograms $CCH(X_t, Y_s|Z)$, $CCH(X_t|Z)$, $CCH(Y_s|Z)$ and $CCH(Y_u|X)$, are calculated. Here, the notation CCH() denotes a crosscoincidence histogram. For example, $CCH(X_t, Y_s|Z)$ is a histogram showing the number of times when the neurons X and Y fire at time differences of t and s respectively after the neuron Z has fired. The notation u denotes a time difference of the neuron Y with the neuron X taken as a reference. The crosscoincidence histograms are each normalized so as to represent a rate of action potential generation of object neuron to action potential generation of conditioning neuron. Using the normalized crosscoincidence histograms, conditional probabilities $p(X_{1,t}, Y_{1,s}|Z^k)$, $p(X_{1,t}|Z^k)$, $p(Y_{1,s}|Z^k)$ and $p(Y_{1,u}|X^i)$ are computed.

Subsequently, remaining conditional probabilities are computed using the following equations:

$$p(X_{1,t}, Y_{0,s}|Z_1) = p(X_{1,t}|Z_1) - p(X_{1,t}, Y_{1,s}|Z_1) \quad (10)$$
$$p(X_{0,t}, Y_{1,s}|Z_1) = p(Y_{1,s}|Z_1) - p(X_{1,t}, Y_{1,s}|Z_1)$$
$$p(X_{0,t}, Y_{0,s}|Z_1) =$$
$$\quad 1 - p(X_{1,t}, Y_{1,s}|Z_1) - p(X_{1,t}, Y_{0,s}|Z_1) - p(X_{0,t}, Y_{1,s}|Z_1)$$
$$p(X_{1,t}, Y_{0,s}|Z_0) = p(X_{1,t}|Z_0) - p(X_{1,t}, Y_{1,s}|Z_0)$$
$$p(X_{0,t}, Y_{1,s}|Z_0) = p(Y_{1,s}|Z_0) - p(X_{1,t}, Y_{1,s}|Z_0)$$
$$p(X_{0,t}, Y_{0,s}|Z_0) =$$
$$\quad 1 - p(X_{1,t}, Y_{1,s}|Z_0) - p(X_{1,t}, Y_{0,s}|Z_0) - p(X_{0,t}, Y_{1,s}|Z_0)$$

A three-point mutual information is expressed in terms of a two-point mutual information and a conditional mutual information by the following equation:

$$TMI(X_t; Y_s; Z) = MI(X_t; Y_s) - MI_Z(X_t; Y_s) \quad (11)$$

where TMI is the three-point mutual information, MI is the two-point mutual information and $MI_Z$ is the conditional mutual information.

The two-point mutual information and conditional mutual information are calculated by using the conditional probabilities according to the following equations:

$$MI(X_t; Y_s) = \Sigma\Sigma p(Y_{j,s}|X_{i,t}) p(X_{i,t}) \log \\ (p(Y_{j,s}|X_{i,t})/p(Y_{j,s})) \quad (12)$$

$$MI_Z(X_t; Y_s) = \Sigma\Sigma\Sigma p(Z_k) p(X_{i,t}, Y_{j,s}|Z_k) \log \\ (p(X_{i,t}, Y_{j,s}|Z_k)/(p(X_{i,t}|Z_k) p(Y_{j,s}|Z_k))) \quad (13)$$

Connections among the three neurons can be inferred using the value of $TMI(X_t; Y_s; Z)$ as follows.

[1] If TMI>0, correlation between the neurons X and Y includes a connectivity dependent upon the activity of neuron Z.

[2] If TMI<0, there is higher order connection, in which the firing of the neuron Y varies due to simultaneous firings of the neurons X and Z.

[3] If TMI=0, neither the correlation [1] nor the connectivity [2] exists among the three neurons X, Y and Z.

A connectivity between the neurons X and Y independent of the neuron Z in the case of TMI>0 and the property of the higher-order connection in the case of TMI<0 can be estimated by calculating conditional mutual information at t=t0, at which TMI has a significant peak.

It should be noted that conditional mutual information is nonnegative so that an inhibitory connectivity cannot be distinguished from an excitatory connectivity. Therefore, for the sake of distinction, a negative sign is assigned to indicate an inhibitory connection when the following two inequalities 15 are satisfied.

$$p(X_{1,t0}, Y_{1,s}|Z_0) < p(X_{1,t0}|Z_0) p(Y_{1,s}|Z_0) \quad (15)$$

FIG. 13 shows excitatory synaptic connectivities from the neuron Z to the neurons X and Y and their mutual information. FIG. 13(a) shows connection structure among the neurons X, Y and Z.

Figure 13A:
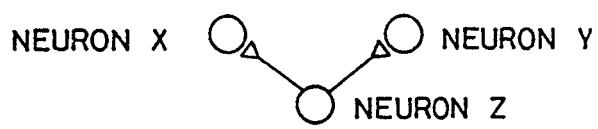
FIGS. 13($a$)–13($d$) shows an example of analysis based on three-point mutual information for a network model having excitatory connections from a neuron Z to neurons X and Y.
Figure 13B:
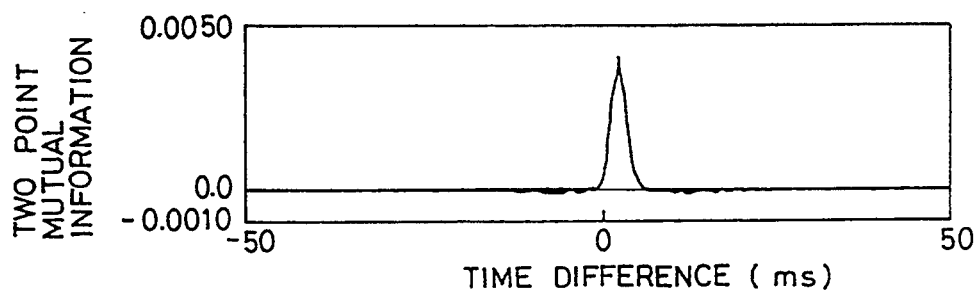
Figure 13C:
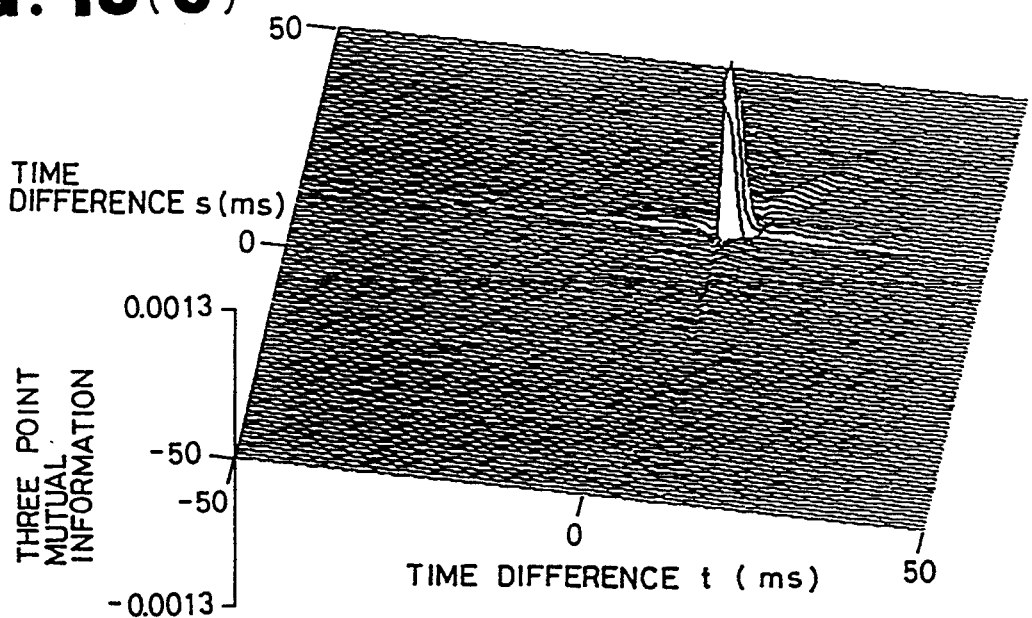
Figure 13D:
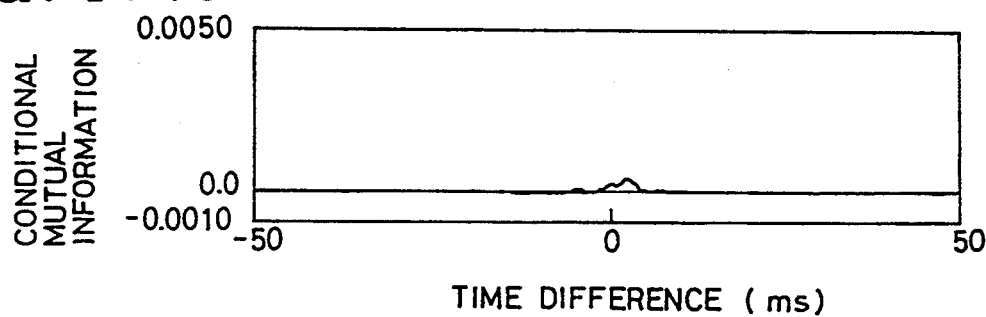

A neural network model having such a connection structure is formed and simulation of a neuron model described in Hodgkins-Huxley equations was performed. Two-point mutual information between the two neurons X and Y were calculated from action potential trains obtained by the simulation. A peak at a time difference of approximately 0 was found as shown in FIG. 13(b). Next, three-point mutual information among the three neurons X, Y and Z were computed and a positive peak at t=10 msec and s=10 msec was found as shown in FIG. 13(c). This implies that correlation between the neurons X and Y includes a connectivity dependent upon activities of the neuron Z. Considering the fact that the time difference between the neurons X and Y is almost 0 at the position of the peak, and the fact that the peak of the two-point mutual information is found at a time difference of 0, an indirect connectivity dependent upon activities of the neuron is also suggested. In order to estimate a connectivity between the two neurons X and Y that is independent of the neuron Z, conditional mutual information was computed and no significant peak is present, indicating that a direct connectivity does not exist between the neurons X and Y. The time difference between the neurons Z and X as well as that between the neurons Z and Y are both 10 msec, implying that there are excitatory synaptic connectivities from the neuron Z to the neurons X and Y which is consistent with neural network model as shown in FIG. 13(a).

Sixth Embodiment

Figure 14:
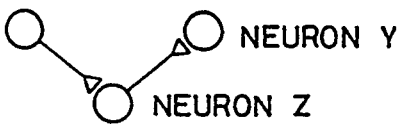
FIGS. 14($a$)–14($d$) shows an example of analysis for a network model having a connection between neurons X and Y through a neuron Z.
Figure 14:
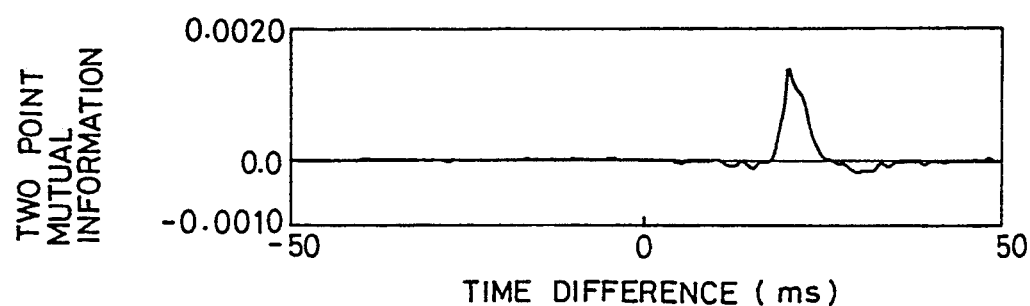
Figure 14:
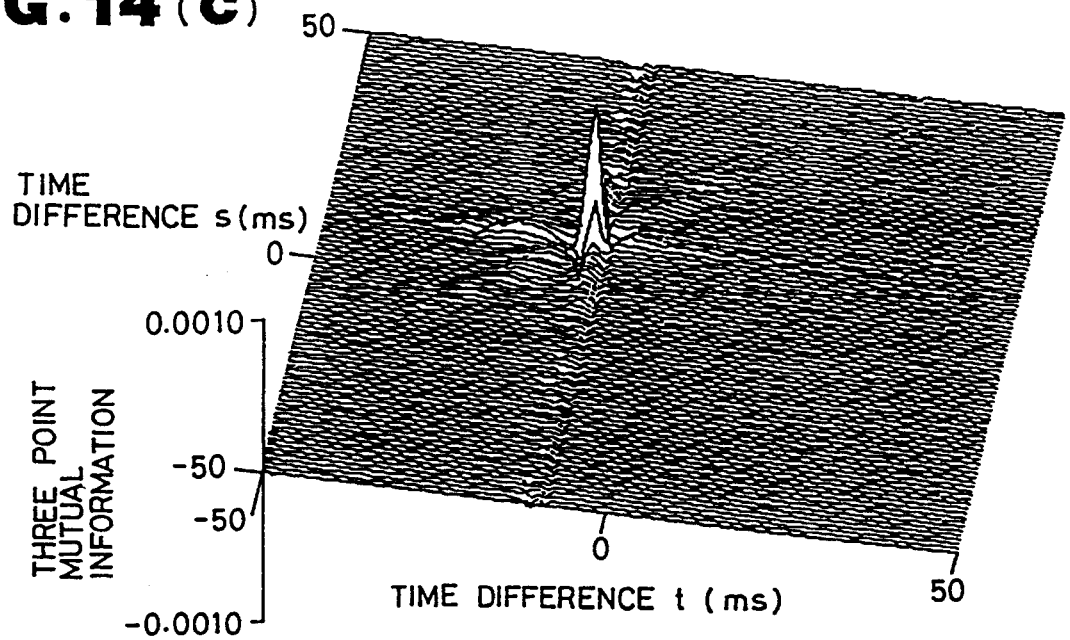
Figure 14:
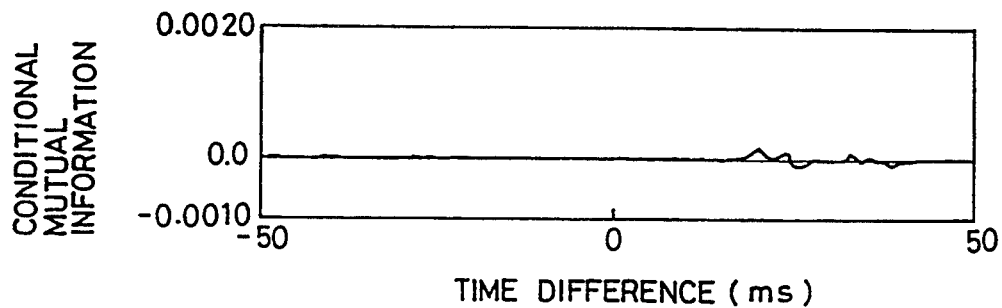

FIG. 14(a) shows a neural network model having excitatory connectivities from a neuron X to a neuron Z and from the neuron Z to a neuron Y. Two-point mutual information between the neurons X and Y were computed and a peak at a time difference of 20 msec was found as shown in FIG. 14(b). Three-point mutual information was then calculated and a positive peak at t=−10 msec and s=10 msec was found as shown in FIG. 14(c). This implies that correlation between the neurons X and Y includes a connectivity dependent upon activities of the neuron Z. Considering the fact that the time difference between the neurons X and Y is 20 msec at the position of the peak, it is seen that on the peak of the two-point mutual information at a time difference of 20 msec, there is an indirect connectivity dependent upon activities of the neuron Z. Much like the sixth embodiment, conditional mutual information was computed and no significant peak is present, indicating that a direct connectivity does not exist between the neurons X and Y. From the time difference between the neurons Z and X and the time difference between the neurons Z and Y, it is indicated that there is a connectivity from the neuron X to the neuron Z, instead of existing from the neuron Z to the neuron X, and from neuron Z to the neuron Y. This estimation is consistent with neural network model as shown in FIG. 14(a).

Seventh Embodiment

Figure 15A:
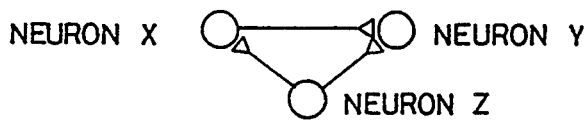
FIGS. 15($a$)–15($d$) shows an example of analysis for a network model having excitatory connections from a neuron Z to neurons X and Y and an excitatory connection from the neuron X to the neuron Y.
Figure 15B:
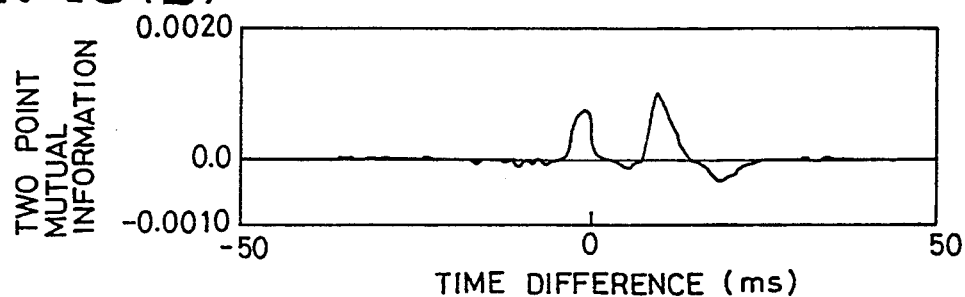
Figure 15C:
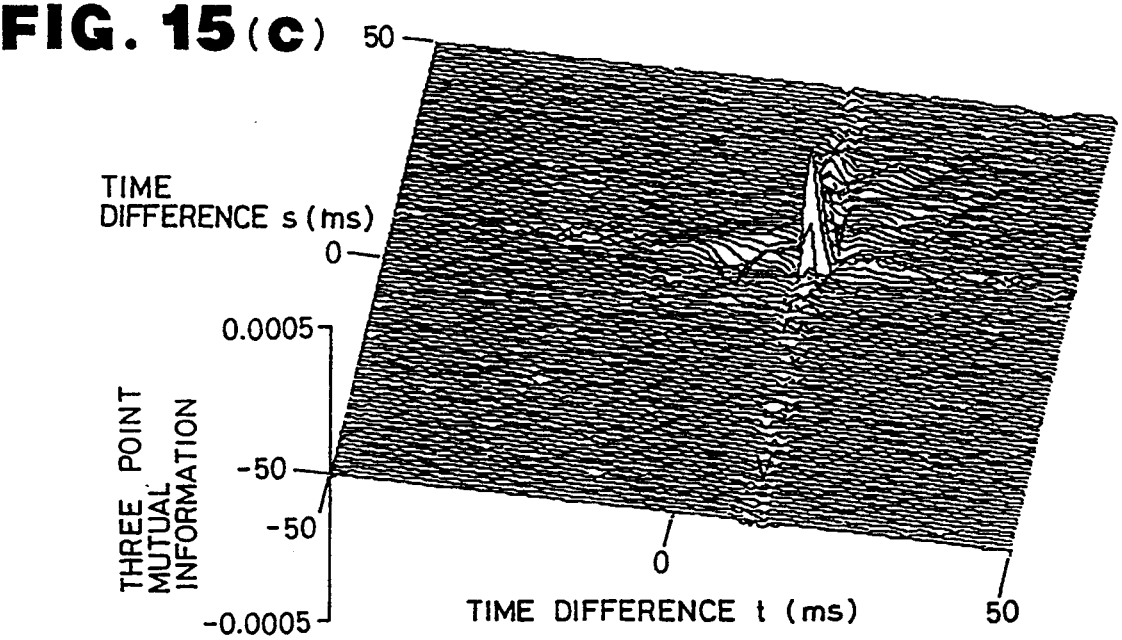
Figure 15D:
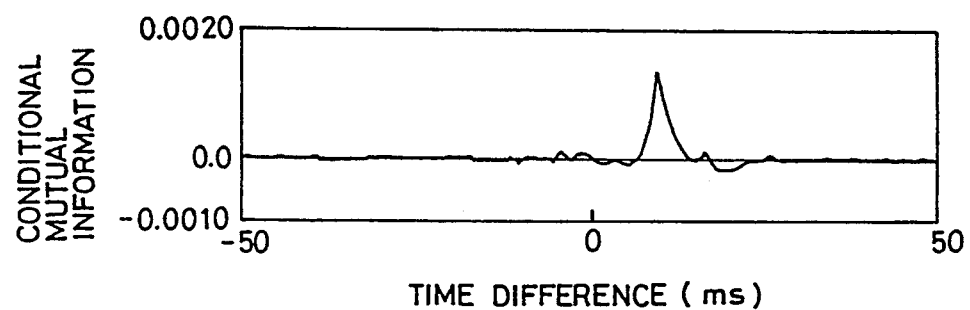

FIG. 15(a) shows a neural network model having excitatory connectivities from a neuron Z to neurons X and Y as well as an excitatory synaptic connectivity from the neuron X to the neuron Y. Two-point mutual information between the neurons X and y were computed and two peaks at time differences of 0 and 20 msec were found as shown in FIG. 15(b). Three-point mutual information was then calculated and a positive peak at t=10 msec and s=10 msec was found as shown in FIG. 15(c). This implies that correlation between the neurons X and Y includes a connectivity dependent upon activities of the neuron Z. Considering the fact that the time difference between the neurons X and Y is 20 msec at the position of the peak, it is seen that on the peak of the two-point mutual information at a time difference of 0 msec, there is an indirect connectivity. In order to estimate a connectivity between the two neurons X and Y that is independent of the neuron Z, conditional mutual information was computed and a peak at a time difference of 10 msec was found. The peak of the two-point mutual information at a time difference of 10 msec indicates direct connection between the neurons X and Y. On the other hand, the peak of the two-point mutual information at the time difference 0 msec is suggested to be indirect connectivity dependent upon the neuron Z. Considering the time difference between the neurons Z and X and the time difference between the neurons Z and Y, it is indicated that excitatory connectivities exist from the neuron Z to the neurons X and Y, and from the neuron X to the neuron Y. This estimation is consistent with the neural network model as shown in FIG. 15(a).

Eighth Embodiment

Figure 16:
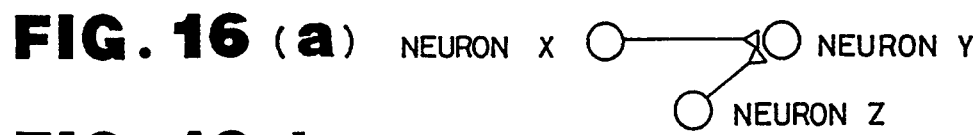
FIGS. 16(a)–16(d) shows an example of analysis for a network model having exclamatory connectivities from a neuron Z to neurons X and Y.
Figure 16:
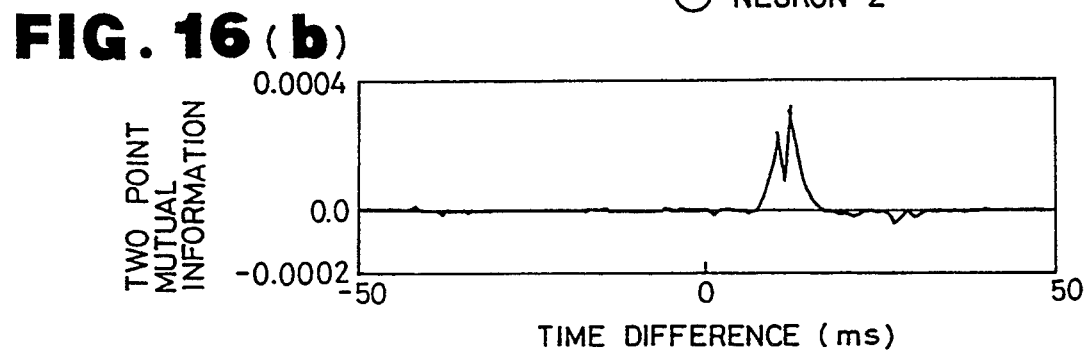
Figure 16:
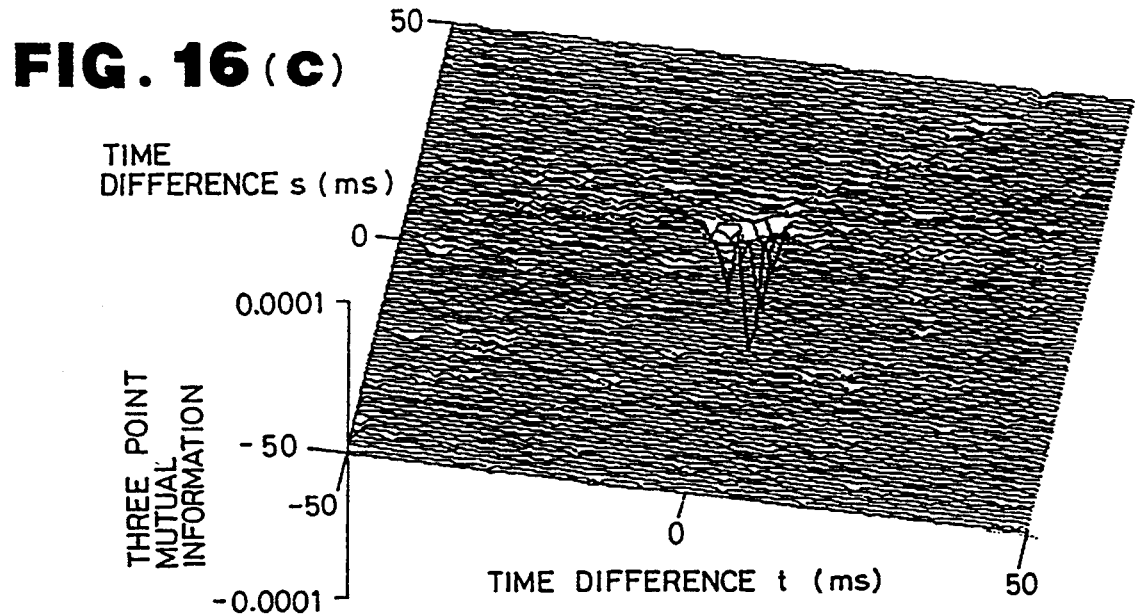
Figure 16:
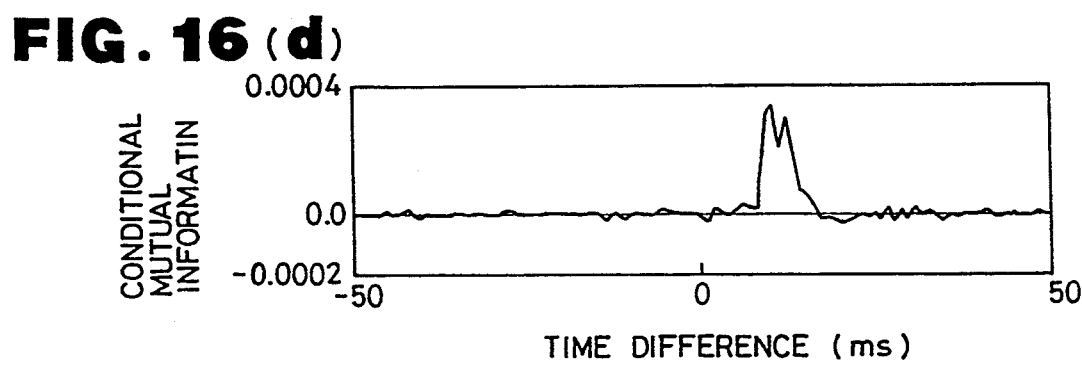

FIG. 16(a) shows a neural network model having an excitatory connection from a neuron Z to a neuron Y and an excitatory connection from a neuron X to the neuron Y. The synaptic strengths are set such that single action potential of either of the neurons Z and X does not cause the neuron Y to fire but coincident firing of the neurons Z and X causes the neuron Y to fire. Two-point mutual information was calculated and a peak was found as shown in FIG. 16(b). Three-point mutual information was then computed and a negative peak at t=0 and s=10 msec was found as shown in FIG. 16(c). This implies that there is a higher-order connection among the three neurons X, Y and Z so that the firing of the neuron Y varies in accordance with a combination of states of the neurons Z and X, i.e., the simultaneous firing of the neurons Z and X in this case. By calculating conditional mutual information, we can infer properties of a higher-order relation. In this case, there is an excitatory connection, in which the firing of the neuron Y increases due to coincident firing of the neurons X and Z.

The simulated neural network model was the connection structure shown in FIG. 16(a). By inferring a connection structure from results of computation of two and three-point mutual information as described above, also in this case, the connection structure shown in FIG. 16(a) can be correctly inferred as well.

Ninth Embodiment

Figure 17A:
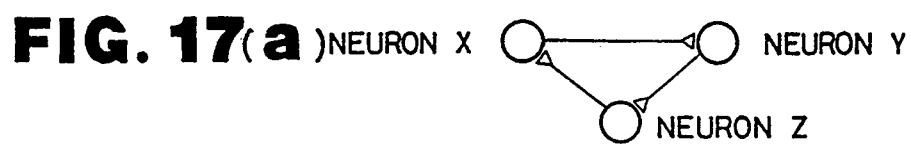

FIG. 17(a) shows a model in which excitatory synaptic connectivities exist from a neuron Z to a neuron X, from the neuron X to a neuron Y and from the neuron Y to the neuron Z. Results of simulation of a neural network having such a structure of connectivites, which is similar to the simulation of the sixth embodiment, are described as follows.

Figure 17B:
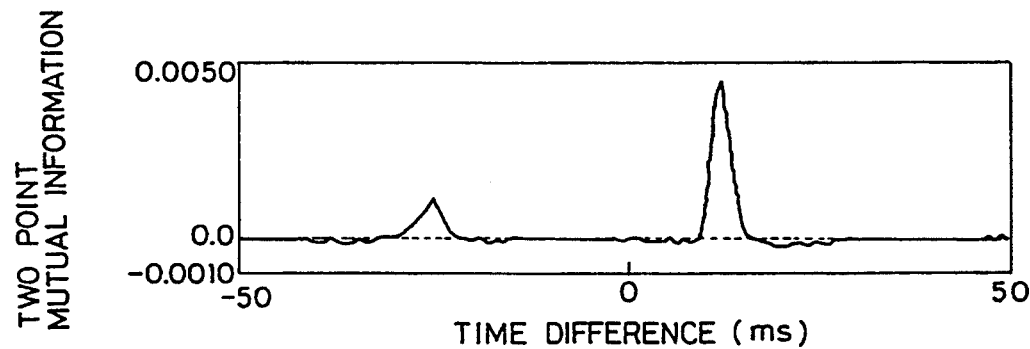

When computing two-point mutual information of the neurons X and Y from action potential trains of the neurons X and Y obtained from the simulation, two peaks of the mutual information are found at time differences of −20 msec and 10 msec as shown in FIG. 17(b).

Figure 17C:
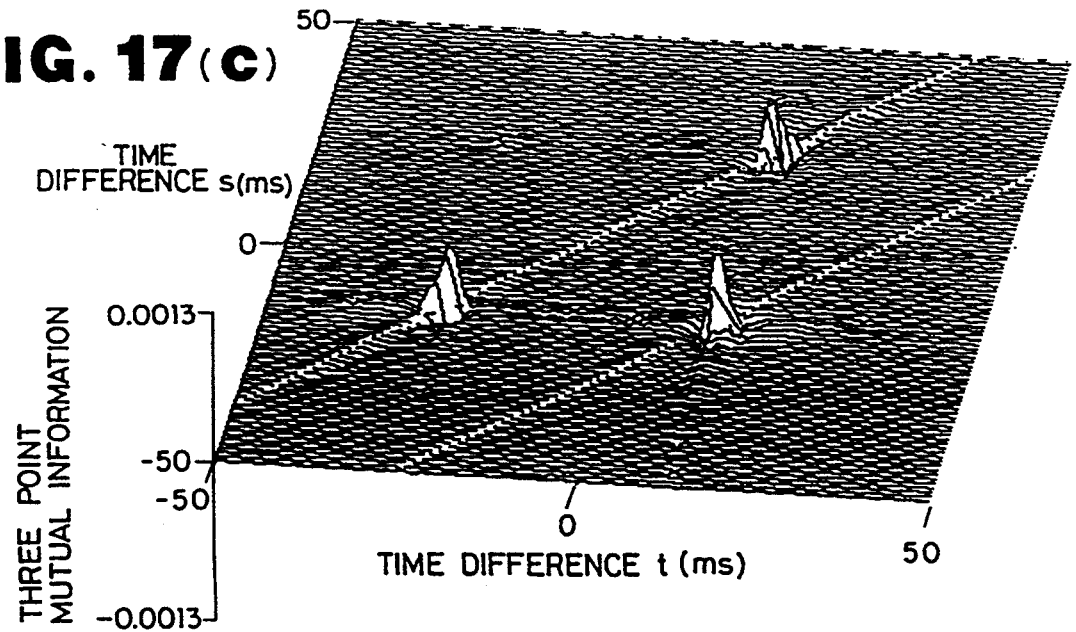

In addition, when computing three-point mutual information among the three neurons X, Y and Z, positive peaks of the three-point mutual information are found at (t,s)=(10,20),(10,−10) and (−20,−10) [msec] as shown in FIG. 17(c). The positive peaks indicate that there is a connection dependent upon activities of the other neuron, e.g., neuron Z, in the correlation between two neurons, e.g., neurons X and Y. Thus, three such indirect connections exist among the three neurons.

Let a synaptic connectivity exist at a time difference of t0 between the neurons Z and X. In this case, peaks of three-point mutual information which represent a correlation including this synaptic connection should exist on a line of t=t0. Likewise, peaks of three-point mutual information which represent a correlation including a synaptic connection between the neurons Z and Y should exist on a line of s=s0. Similarly, a peak of three-point mutual information which represents a correlation including a synaptic connectivity between the neurons X and Y should exist on a line of s−t=u0.

It is obvious from FIG. 17(c) that the peaks of (10,20) and (10,−10) are located on the line of t=10. Likewise, the peaks of (10,−10) and (−20,−10) are located on the line of s=−10. Similarly, the peaks of (10,20) and (−20,−10) are located on the line of s−t=10. Accordingly, it is indicated that there are connections between the neurons Z and X at a time difference of 10 msec, between the neurons Z and Y at a time difference of −10 msec and between the neurons X and Y at a time difference of 10 msec.

In this case, when examining whether each of the synaptic connectivities is excitatory or inhibitory by the condition of inequality 15 using the values of the conditional probabilities, it was found that all the synaptic connectivities were excitatory.

The simulated object was the neural network model among neurons X, Y and Z shown in FIG. 17(a). By inferring a connection structure from results of computation of two and three-point mutual information as described above, also in this case, the connection structure shown in FIG. 17(a) can be correctly inferred as well.

Tenth Embodiment

In the embodiments described so far, conditional probabilities are computed from crosscoincidence histograms. An eleventh embodiment adopts a technique for calculating probabilities by expressing time-course states by trains of symbols and then comparing the trains of symbols to each other.

Eleventh Embodiment

In the embodiments described so far, action potential trains are converted to binary values 0 and 1. In the case of a twelfth embodiment, the probabilities are calculated by classifying time-course data of neuron membrane potentials into three or more values.

Twelfth Embodiment

In the embodiments described so far, a connection structure among three neurons is inferred from three-point mutual information and conditional mutual information. In the case of a thirteenth embodiment, a connection structure among four or more neurons is inferred from four or more-point mutual information.

As described above, according to the first aspect of the present invention, conditional probabilities are computed to calculate channel capacity. The conditional probabilities are further compared to each other in order to distinguish an inhibitory connectivity from an excitatory one. In this way, the magnitude of correlation among time-course data is estimated quantitatively to give a method which allows a connectivity between neurons to be computed without regard to a firing probability and an excitatory connectivity to be distinguished from an inhibitory one with ease. As a result, the present invention provides an interneuron correlation detection technique that allows a quantitative estimation of connectivity to be identified sensitively only from the time-course data of the neurons. If, for some reasons, the state of a connectivity between neuron changes, the interneuron-correlation detection method can also cope with such a change by allowing the change to be estimated quantitatively.

Furthermore, according to the second aspect of the present invention, it is possible to infer a connection structure. As a result, the present invention also provides an estimation technique for inferring the structure of a neural network from action potential trains of a large number of neurons which is obtained by a variety of multi-point measurement methods.

What is claimed is:

1. An interneuron-correlation detection method for detecting correlation among time-course data of biological neurons' activities in order to set the strength of an interneuron connectivity required for implementation in a computer of a neural network model, said interneuron-correlation detection method comprising the steps of:

calculating in the computer conditional probabilities of a biological neuron state at a time difference under another biological neuron state from said time-course data of said biological neuron activities:

calculating in the computer a channel capacity from said calculated conditional probabilities, wherein said channel capacity is defined as a maximum value of mutual information, used in a well known information theory, with respect to a firing probability of a presynaptic neuron;

distinguishing an inhibitory connectivity from an excitatory connectivity by comparing in the computer said conditional probabilities to each other;

quantitatively determining in the computer the magnitude of crossrelation among said time-course data, on the basis of the channel capacity calculated; and using the magnitude of crossrelation determined to set the strength of the interneuron connectivity in the neural network model.

2. An interneuron-correlation detection method according to claim 1, wherein said step of calculating conditional probabilities further comprises calculating in the computer cross-coincidence histograms from said time-course data of said biological neuron activities.

3. An interneuron-correlation detection method according to claim 1, wherein said step of calculating conditional probabilities further comprises comparing in the computer trains of symbols expressing time-course states of said biological neuron activities from said time-course data of said biological neuron activities.

4. An interneuron-correlation detection method according to claim 1, wherein said biological neuron time-course data is represented by binary values, representing a firing state and nonfiring state.

5. An interneuron-correlation detection method according to claim 1, wherein said biological neuron time-course data comprises time-course values of membrane potentials of neurons and are classified into categories corresponding to at least three types of neuron membrane potential states.

6. An interneuron connection-structure estimation method for inferring a connection structure among three or more biological neurons interconnected by an unknown connection structure by calculating in a computer crossrelations among time-course data of activities of the three or more neurons, said interneuron connection-structure estimation method comprises the steps of:

detecting firing activities of the three or more neurons;

reading as time-course data the firing activities detected;

computing in the computer conditional probabilities of one neuron's state or a combination of two neuron's states of the three or more neurons at a time difference under other neuron's states of the three or more neurons from said neuron-activity time-course data;

computing in the computer conditional mutual information and multi-point mutual information used in the information theory from said computed conditional probabilities;

estimating effects of third and subsequent neurons of the three or more neurons on a connectivity between first and second neurons of the three or more neurons; and inferring from the estimated effects a connection structure among the three or more neurons.

7. An interneuron connectivity-structure estimation method according to claim 6, wherein conditional probabilities are calculated from cross-coincidence histograms at a stage of computing said conditional probabilities from said time-course data of said neuron activities.

8. An interneuron connection-structure estimation method according to claim 6, wherein conditional probabilities are calculated by comparing trains of symbols expressing time-course states of neurons' activities at a state of computing said conditional probabilities from said time-course data of said neuron activities.

9. An interneuron connection-structure estimation method according to claim 6, wherein said neuron time-course data is represented by binary values, representing a firing state and a nonfiring state of an ungenerated activity potential respectively.

10. An interneuron connection-structure estimation method according to claim 6, wherein said neuron time-course data comprises time-course values of membrane potentials of neurons and are classified into categories corresponding to at least three types of neuron membrane potential states.

11. An interneuron connection-structure estimation method for inferring a connection structure among biological neurons by calculating a crossrelation among time-course data of activities of said neurons, said interneuron connectivity-structure estimation method comprises the steps of:

detecting firing activities of the three or more neurons;

reading as time-course data the firing activities detected;

computing values of a conditional probability of a neuron's state from said neuron activity time-course data with time-course data of activities of another neuron taken as a condition;

calculating a channel capacity defined as a maximum value of a mutual information with respect to firing probability of a presynaptic neuron from said computed conditional-probability values;

distinguishing an inhibitory connectivity from an excitatory one by comparing said computed conditional-probability values to each other; and quantitatively estimating the magnitude of said crossrelation among said time-course data by using said channel capacity and distinction between excitatory and inhibitory connectivities.

12. An interneuron connection-structure estimation method for inferring a structure of connectivities among three or more biological neurons interconnected by an unknown connection structure by calculating a crossrelations among time-course data of activities of said three or more neurons, said interneuron connection-structure estimation method comprises the steps of:

detecting firing activities of the three or more neurons;

reading as time-course data the firing activities detected;

computing values of a conditional probability of one neuron's state of the three or more neurons firing from said neuron activity time-course data with time-course data of activities of another neuron of the three or more neurons taken as a condition;

calculating multi-point mutual information and conditional mutual information from said computed conditional-probability values;

inferring an effect of a neuron of the three or more neurons on a connectivity between two other neurons of the three or more neurons by using said multi-point mutual information and said conditional mutual information; and inferring a connection structure among said three or more neurons from said effect and said multi-point mutual information quantities.

13. A method for preparing a neural network model comprising the steps of:

determining a connection structure of a biological neural network on the basis of a connection structure estimation method; and preparing a neural network model on the basis of the determined connection structure;

said connection structure estimation method comprising the steps of:

calculating in a computer conditional probabilities of a neuron's state at a time difference under another neuron's state at a time difference under another neuron's state from said time-course data of said neuron activities;

calculating in the computer a channel capacity from said calculated conditional probabilities, wherein said channel capacity is defined as a maximum value of mutual information, used in a well-known information theory, with respect to a firing probability of a presynaptic neuron;

distinguishing an inhibitory connectivity from an excitatory connectivity by comparing in the computer said conditional probabilities to each other;

quantitatively determining in the computer the magnitude of cross relation among said time-course data, on the basis of the channel capacity calculated; and using the magnitude of crossrelation determined to set the strength of the interneuron connectivity in the neural network model.

14. A method for preparing a neural network model comprising the steps of:

determining a connection structure of a biological neural network on the basis of a connection structure estimation method; and preparing a neural network model on the basis of the determined connection structure;

said connection structure estimation method comprising the steps of:

detecting firing activities of three or more neurons;

reading as time-course data the firing activities detected;

computing in a computer conditional probabilities of one neuron's state or a combination of two neuron's state of the three or more neurons from said neuron-activity time-course data;

computing in the computer conditional mutual information and multi-point mutual information, used in a well known information theory, from said computed conditional probabilities;

estimating effects of third and subsequent neurons of the three or more neurons on a connectivity between first and second neurons of the three or more neurons; and inferring from the estimated effects a connection structure among the three or more neurons.

15. A neural network model implemented by a computer or on a neural network imitation circuit, prepared on the basis of a connection structure of a biological neural network determined by a connection structure estimation method, said connection structure estimation method comprising the steps of:

calculating in a computer conditional probabilities of a neuron's state at a time difference under another neuron's state at a time difference under another neuron's state from said time-course data of said neuron activities;

calculating in the computer a channel capacity from said calculated conditional probabilities, wherein said channel capacity is defined as a maximum value of mutual information, used in a well-known information theory, with respect to a firing probability of a presynaptic neuron;

distinguishing an inhibitory connectivity from an excitatory connectivity by comparing in the computer said conditional probabilities to each other;

quantitatively determining in the computer the magnitude of cross relation among said time-course data, on the basis of the channel capacity calculated; and using the magnitude of crossrelation determined to set the strength of the interneuron connectivity in the neural network model.

16. A neural network model implemented by a computer or on a neural network imitation circuit, prepared on the basis of a connection structure of a biological neural network determined by a connection structure estimation method, said connection structure estimation method comprising the steps of:

detecting firing activities of three or more neurons;

reading as time-course data the firing activities detected;

computing in a computer conditional probabilities of one neuron's state or a combination of two neuron's state of the three or more neurons from said neuron-activity time-course data;

computing in the computer conditional mutual information and multi-point mutual information, used in a well known information theory, from said computed conditional probabilities;

estimating effects of third and subsequent neurons of the three or more neurons on a connectivity between first and second neurons of the three or more neurons; and inferring from the estimated effects a connection structure among the three or more neurons.

* * * * *